United States Patent [19]

Flament et al.

[11] Patent Number: 4,669,921
[45] Date of Patent: Jun. 2, 1987

[54] DEVICE FOR SUPPLYING A POWDERY PRODUCT IN GRAVIMETRICALLY METERED AMOUNTS TO A PNEUMATIC LINE

[75] Inventors: Gérard Flament, Verneuil-en-Halatte; Jean P. LeCalvez, Paris, both of France

[73] Assignee: Charbonnages de France, Paris, France

[21] Appl. No.: 745,640

[22] Filed: Jun. 17, 1985

[51] Int. Cl.⁴ ............................................. B65G 53/66
[52] U.S. Cl. .......................................... 406/14; 406/31; 406/79; 406/146
[58] Field of Search ....................... 406/14, 19, 29, 30, 406/124–126, 32, 25, 146, 31, 79; 48/DIG. 4, 86 R; 422/242; 110/186, 293, 105, 116, 261, 263, 189

[56] References Cited

U.S. PATENT DOCUMENTS

| | | | |
|---|---|---|---|
| 531,379 | 12/1894 | Mathewson | 406/146 |
| 727,030 | 5/1903 | Tilghman, Jr. | 406/146 X |
| 2,990,898 | 7/1961 | Goslin | 177/16 |
| 3,039,655 | 6/1962 | Pfeuffer | 406/14 |
| 4,373,451 | 2/1983 | Gardner | 110/347 |

FOREIGN PATENT DOCUMENTS

| | | | |
|---|---|---|---|
| 2526541 | 5/1983 | France . | |
| 75321 | 6/1981 | Japan | 406/14 |
| 115246 | 5/1969 | United Kingdom | 406/146 |

Primary Examiner—Jeffrey V. Nase
Attorney, Agent, or Firm—Cushman, Darby & Cushman

[57] ABSTRACT

A gravimetric metering apparatus with a constant throughput is enclosed inside a sealed chamber and connected through the wall of the chamber, by a first pipe, to a pneumatic conveyor line operating under a pressure of n bars and, by a second pipe, to an intermittently operated external loading hopper. The chamber is filled with gas under a pressure of n bars which is equal to that inside the pneumatic conveyor line.

3 Claims, 1 Drawing Figure

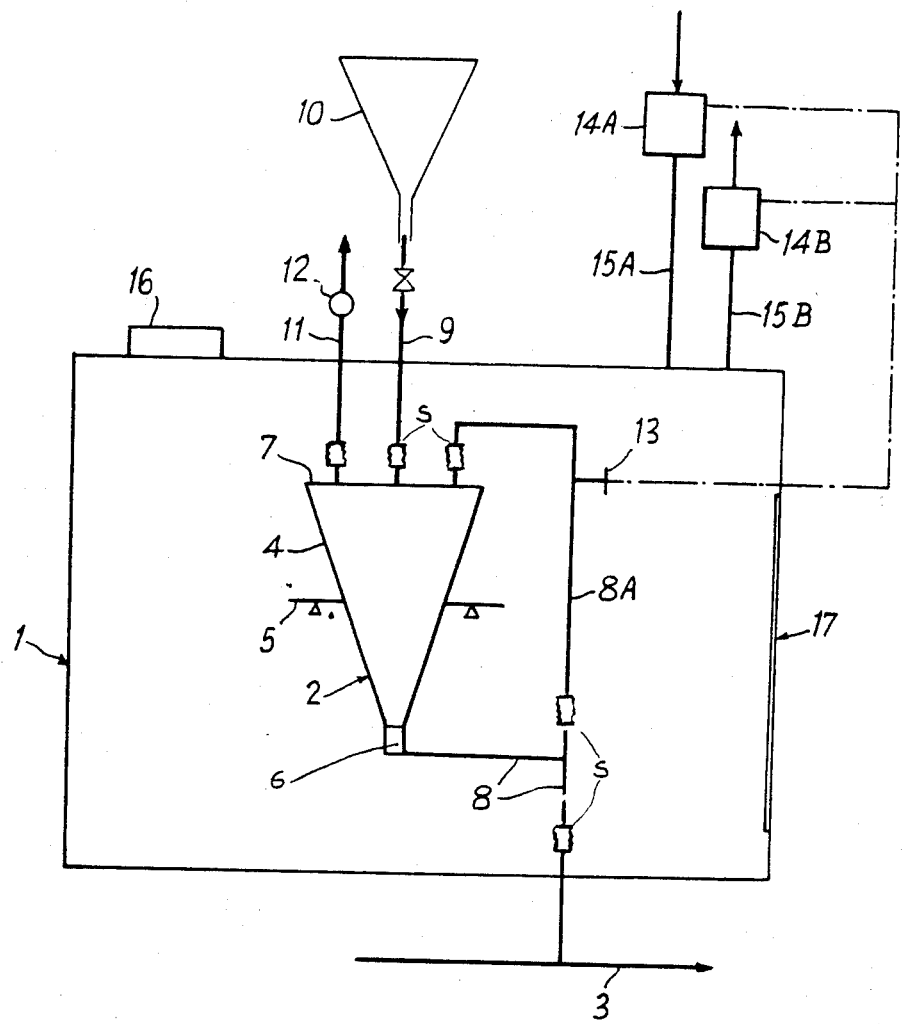

DEVICE FOR SUPPLYING A POWDERY PRODUCT IN GRAVIMETRICALLY METERED AMOUNTS TO A PNEUMATIC LINE

BACKGROUND TO THE INVENTION

The invention relates to a device for supplying a plant, machine or apparatus, in particular a boiler burner, with gravimetrically metered amounts of a powdery product via a pneumatic line containing gas under pressure..

In the case of a boiler, the product can be pulverised coal and the gas in the pneumatic line is usually air to be supplied to the burner.

DESCRIPTION OF THE PRIOR ART

Lines for pneumatically conveying powdery or granular products are generally already known.

French Patent Specification No. 2,526,541 describes a metering apparatus, the function of which is to supply gravimetrically metered amounts of a powdery product which is introduced into a pneumatic conveyor line. This apparatus comprises a rotor with individual chambers which are arranged circumferentially and which pass, in succession, in front of a loading station underneath a hopper where they are filled with the powdery product and in front of an unloading station where pressurised air expels this product into the pneumatic conveyor line. Precisely because of this method of operation, this line is not supplied in a perfectly continuous manner, but intermittently. Even if the intermittent nature of this supply method is minimised, this method of operation is not suitable for supplying a burner because it gives rise to irregularities in the flow which disturb the flame. High-quality combustion is obtained only when the flow of pulverised coal to the burner is uniform and constant.

Moreover, an apparatus for continuously metering loose powdery products is also known. The products are conveyed to a hopper underneath which an extractor/discharger belt is located. That assembly rests on a highly sensitive weighing device. A control element containing microprocessor continuously calculates the loss of weight per unit of time and regulates the speed of the extractor belt in accordance with the deviation from a reference value for the throughput. For throughputs which may lie between 0.1 and 10,000 kg/h, the accuracy is of the order of ±1%. This apparatus is commercially available under the reference LWF-B from the Swiss company K-TRON SODER. Other similar apparatus are made by other manufacturers and are used mainly in the food industry.

On account of its uniform and precise throughput, such an apparatus is suitable in particular for supplying a pulverised-coal burner. However, it is not suitable for pressurised operation which involves supplying a pneumatic line which itself has passing through it a flow of pressurised air conveying the powdery product. The outlet orifice of this apparatus cannot be directly connected to a pneumatic line.

SUMMARY OF THE INVENTION

It is an object of the invention, to provide a device which can be combined with the apparatus for continuously metering loose powdery products which is described above so that that apparatus can be used as a means for supplying a pneumatic line with a pulverised and metered product at a constant and precise throughput, without vibrations or irregularities in the flow of the product.

It is a further object of the invention to ensure, with that device, protection against the risks of explosion in the event of an explosive mixture being formed from the metered product and the gas in the pneumatic line.

According to the invention there is provided a device for supplying a powdery product in gravimetrically metered amounts and with a controlled throughput to a pneumatic conveyor line, the device comprising a gravimetric metering apparatus, a hopper in the gravimetrically metering apparatus for holding the product to be supplied, an extractor/discharger in the gravimetric apparatus for supplying the product in the hopper to a pneumatic conveyor line which operates under a pressure of n bars, a sealed chamber which contains the gravimetric metering apparatus in its entirety, a first pipe which passes through the wall of the chamber for connecting the extractor/discharger to the pneumatic conveyor line, a second pipe which passes through the wall of the chamber for connecting the hopper of the gravimetric metering apparatus to an external loading hopper for holding the product to be supplied to the hopper of the gravimetric metering apparatus and means for creating and regulating a gas pressure inside the chamber at a value of n bars which is equal to that inside the pneumatic conveyor line.

In order to supply a powdery product to a user appliance which must be supplied at a constant and metered throughput via a pressurised pneumatic line using a gravimetric metering apparatus comprising a hopper and an extractor/discharger, according to the invention a sealed chamber contains the gravimetric metering apparatus in its entirety. Means for creating and regulating gas pressure inside the chamber are connected to the chamber so as to maintain inside it a pressure equal to the pressure created in the pneumatic line. A first pipe passes through the wall of the chamber and connects the outlet of the extractor/discharger to the pneumatic line. A second pipe passes through the wall of the chamber and connects the hopper of the gravimetric metering apparatus to an external loading hopper which operates intermittently and under pressure and is of a type known per se which is commercially available.

Preferably, the hopper of the gravimetric metering device is closed at the top, the first pipe coming from the pneumatic line and passing through the wall of the chamber to a branched section which leads to the hopper inside which it emerges. Advantageously, the first pipe is provided with a sensor for sensing the differential pressure between the pneumatic line and the inside of the chamber. The sensor operates the means for creating and regulating the gas pressure inside the chamber. It is preferable to provide a third pipe which exists from the hopper and which passes through the wall of the chamber so as to allow the gas to escape from the hopper when the hopper is loaded.

According to a preferred embodiment of the invention, in use the external loading hopper is installed at a higher level than the chamber, and the second pipe is sufficiently inclined to the vertical for the intermittent loading of the hopper of the metering apparatus to be accomplished at least partially by means of gravity.

BRIEF DESCRIPTION OF THE DRAWING

An embodiment of the present invention will now be described, by way of example only, with reference to the accompanying drawing, in which:

The single FIGURE shows schematically a device according to the invention.

DESCRIPTION OF THE PREFERRED EMBODIMENTS

Referring to the single FIGURE, a chamber 1, which is sealed and designed to withstand an operating pressure of n bars, contains, in its entirety, a gravimetric metering apparatus 2 which is already commercially available. In the illustrated example, the gravimetric apparatus 2 is made by the Swiss company K-TRON SODER and has the reference LWF-B. The apparatus 2 is intended to supply a powdery product, for example pulverised coal, to a pneumatic conveyor line 3 which is located outside the chamber 1 and which leads to a powder-coal burner. The burner must be supplied in a uniform manner without fluctuations, vibrations or irregularities in the flow which adversely affect the quality of combustion.

The metering apparatus 2 comprises a hopper 4 which is supported by a weighing means 5 and which has at its bottom end an extractor/discharger 6 which forms the outlet of the hopper.

In accordance with the invention, the hopper 4 is closed at its top by an upper cover-plate 7. A first pipe 8 leaves the extractor/discharger 6, passes through the wall of the chamber 1 and leads to a pneumatic conveyor line 3 inside which there is a pressure of n bars. A second pipe 9, which emerges inside the hopper 4, departs from the upper cover-plate 7 of the hopper 4, passes through the wall of the chamber 1 and leads to an external loading hopper 10, shown in faint lines, which is located preferably at a level higher than that of the chamber 1. A third pipe 11, which emerges inside the hopper 4, leaves the upper cover-plate 7, passes through the wall of the chamber 1 and emerges in the open air, preferably via a flap valve 12.

The first pipe 8 is extended by a branch 8A which leads to the upper cover-plate 7 so as to emerge inside the hopper 4. A differential-pressure sensor 13 is mounted on this branch 8A of the first pipe 8 and operates means 14A, 14B for creating and regulating an atmosphere with a pressure of n bars inside the chamber 1. More precisely, the means 14A are connected to the chamber 1 via a tube 15A so as to convey a pressurised gas to the inside of the chamber 1, and the means 14B are connected to the chamber 1 via a tube 15B so that gas is able to leave the chamber.

The chamber 1 is equipped with an excess-pressure valve 16 and is provided with a door 17 ensuring a leakproof closure. Flexible connections S are provided along the pipes 8, 8A, 9, 11 at suitable locations.

With the device of the invention, the metering apparatus 2 is exposed in its entirety, both on the outside and on the inside, to the pressure of n bars and there therefore exists a pressure equilibrium as a result of which the apparatus is, in fact, unaffected by the pressure and operates properly. As this pressure is the same as the pressure of n bars which is present inside the pneumatic conveyor line 3, extraction and discharge to the pneumatic conveyor line 3 from the hopper 4, are not disturbed as a result. The supply remains uniform on account of the equilibrium which exists also between the pipe 3 and the hopper 4.

It will be noted that it is not strictly necessary either to seal off the hopper 4 by the upper cover-plate 7, or to join the first pipe 8 to the hopper 4 by the branch 8A of the pipe 8. When the metering apparatus 2 is located completely inside the chamber 1 where a pressure of n bars equal to that of the pneumatic conveyor line 3 is maintained by the generating and regulating means 14A, 14B, there is also a pressure equilibrium inside and outside the metering apparatus 2. In this case, the differential-pressure detector 13 is adapted so as to be affected both by the pressure inside the chamber 1 and by the pressure inside the pneumatic conveyor line 3. However, the pressure is capable of varying inside the pneumatic conveyor line 3. It is important for the pressure equilibrium to be maintained permanently between the inlet of the metering apparatus 2, that is to say the hopper 4, and the outlet of the metering apparatus 2, that is to say the first pipe 8. The arrangement described above is preferred because it guarantees in a definite and permanent manner that pressure equilibrium. The third pipe 11 allows gas to escape from the hopper 4 in the event of a sudden excess pressure which can tend to be formed there, particularly during loading.

The external loading hopper 10 is of a known conventional type. The hopper 10 may be filled with the product, supplied with pressurised gas and connected to the hopper 4 by the second pipe 9 so that the product descends into the hopper 4 by means of gravity. When hopper 10 becomes empty, it is disconnected from the hopper 4, filled again, and so on, such that the hopper 4 is supplied intermittently, without disturbing the metered throughput to the pneumatic conveyor line 3.

The device according to the invention ensures, moreover, that personnel are protected against the danger of an explosion when the metered product and the gas inside the pneumatic conveyor line may create, under certain conditions, an explosive mixture.

What we claim is:

1. A device for supplying a powdery product in gravimetrically metered amounts and with a controlled throughput to a pneumatic conveyor line, comprising:

(a) a gravimetric metering apparatus, having a hopper for holding the product to be supplied and which is, in use, closed at its upper end, and an extractor-discharger belt with a highly sensitive weighing device and a control element containing a microprocessor to regulate the speed of the extractor belt, in order to supply said product to said pneumatic conveyor line which operates under a pressure of n bars;

(b) a sealed chamber which contains said gravimetric metering apparatus in its entirety, with a first pipe going through the wall of the chamber for connecting the extractor-discharger to the pneumatic conveyor line and having a branch which emerges inside said hopper, and a second pipe going through the wall of the chamber for connecting the hopper of the gravimetric metering apparatus to an external loading hopper; and (c) means for creating and regulating a gas pressure inside the sealed chamber at a value of n bars which is equal to the pressure inside the pneumatic conveyor line, said means comprising a differential pressure sensor mounted on said first pipe branch and capable of detecting the difference in pressure between the pneumatic conveyor line and the chamber; a means for allowing gas to enter inside the chamber; and a means for allowing gas to escape outside the chamber, said two latter means being opeated by the differential pressure sensor.

2. A device according to claim 1, wherein a third pipe leaves the hopper of the gravimetric metering apparatus, passes through the wall of the chamber and emerges outside the chamber so as to permit gas to escape from the hopper during loading of the hopper.

3. A device according to claim 1, further comprising an external loading hopper which, in use, is installed at a level higher than that of the hopper of the gravimetric metering apparatus whereby loading of the hopper from the external loading hopper is accomplished, at least partially, by means of gravity.

* * * * *